Figure 1:
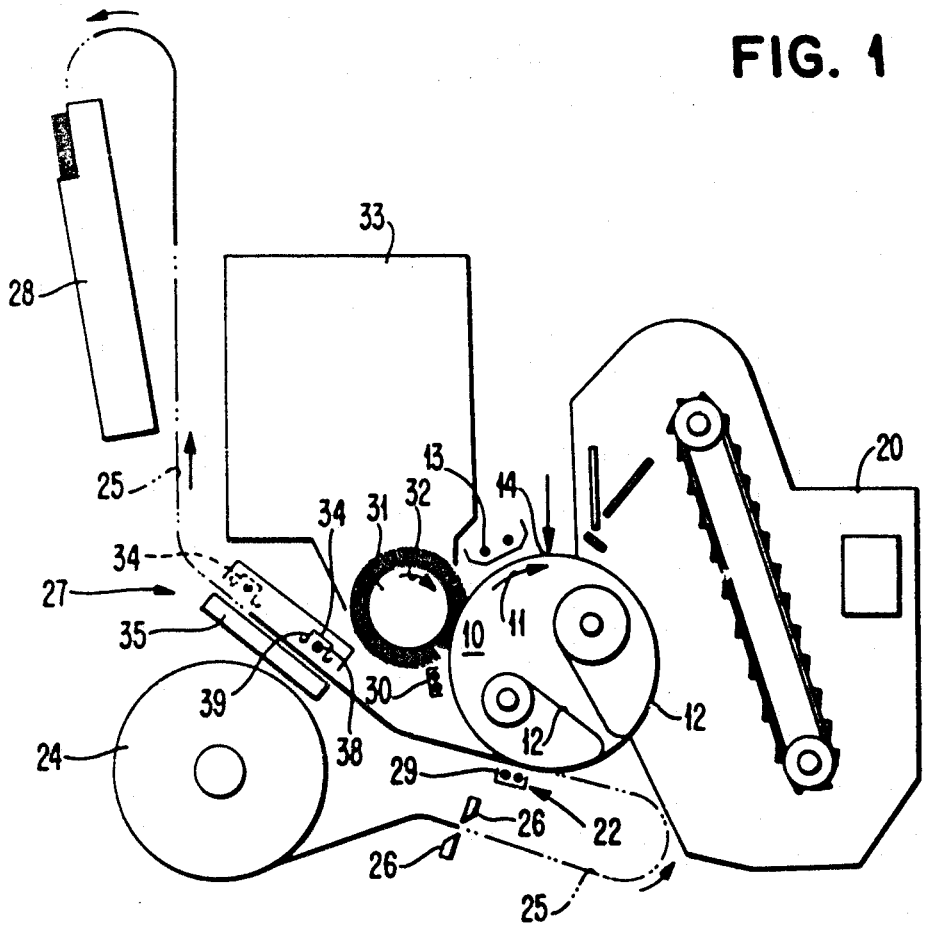
Figure 2:
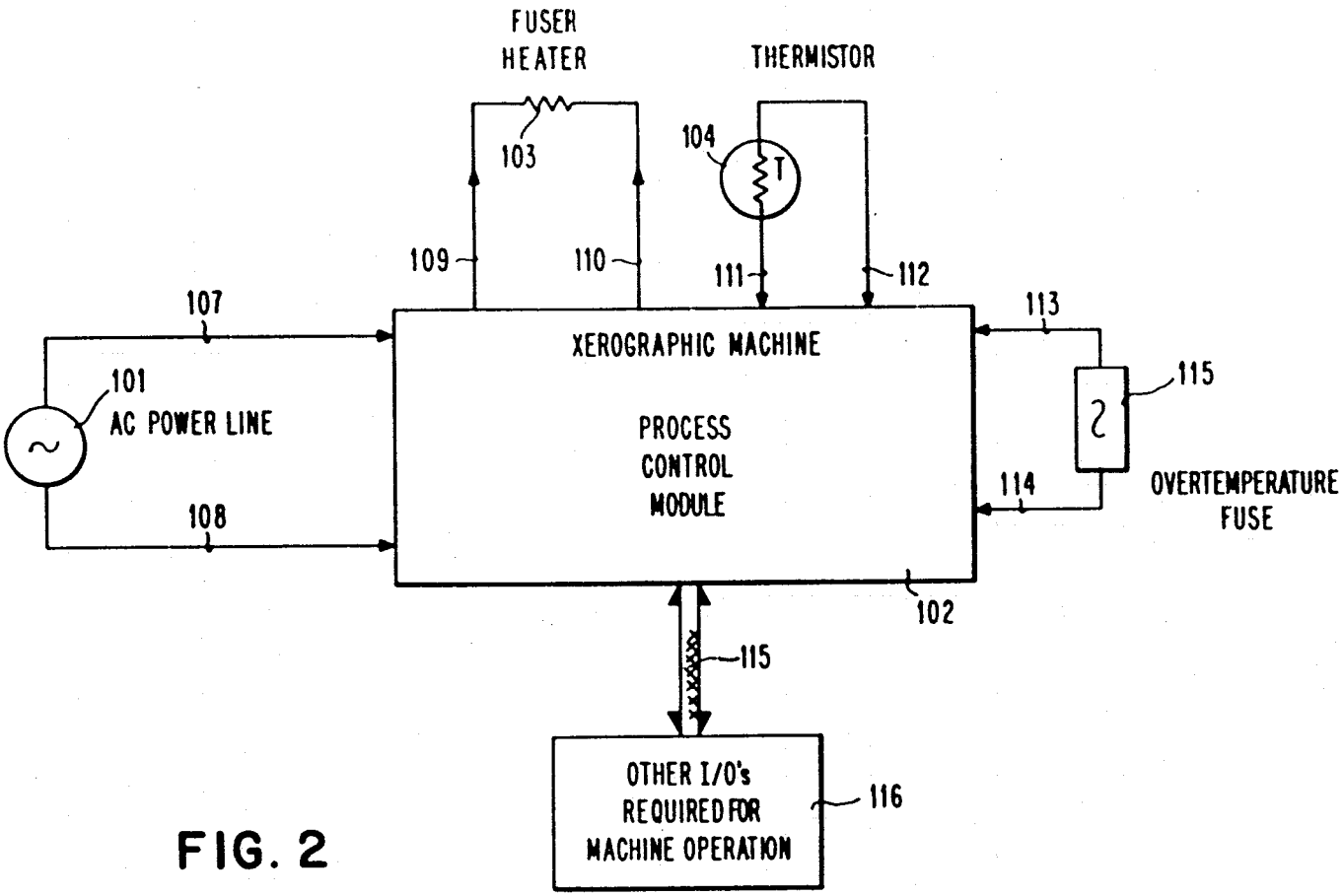
Figure 3:
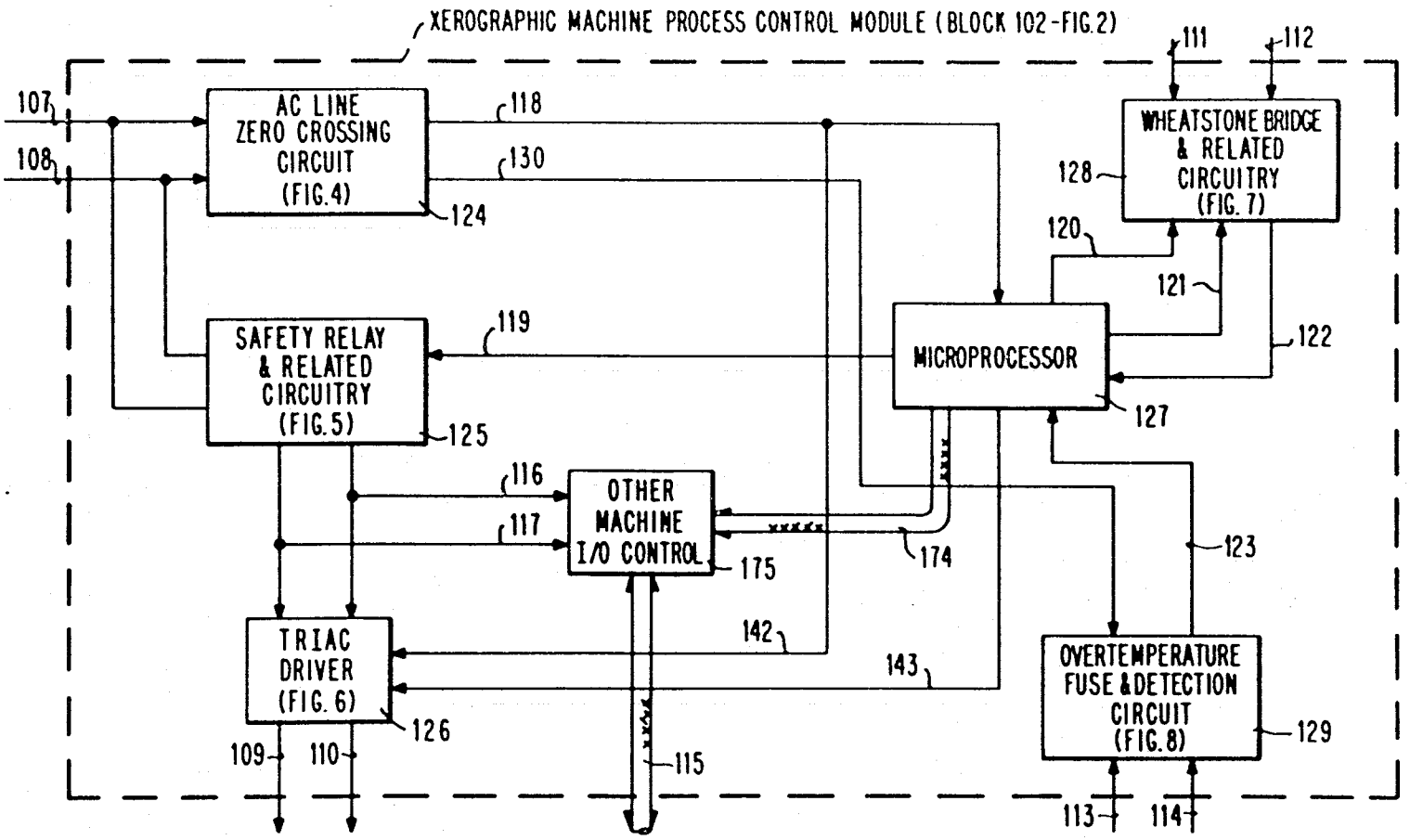
Figure 4:
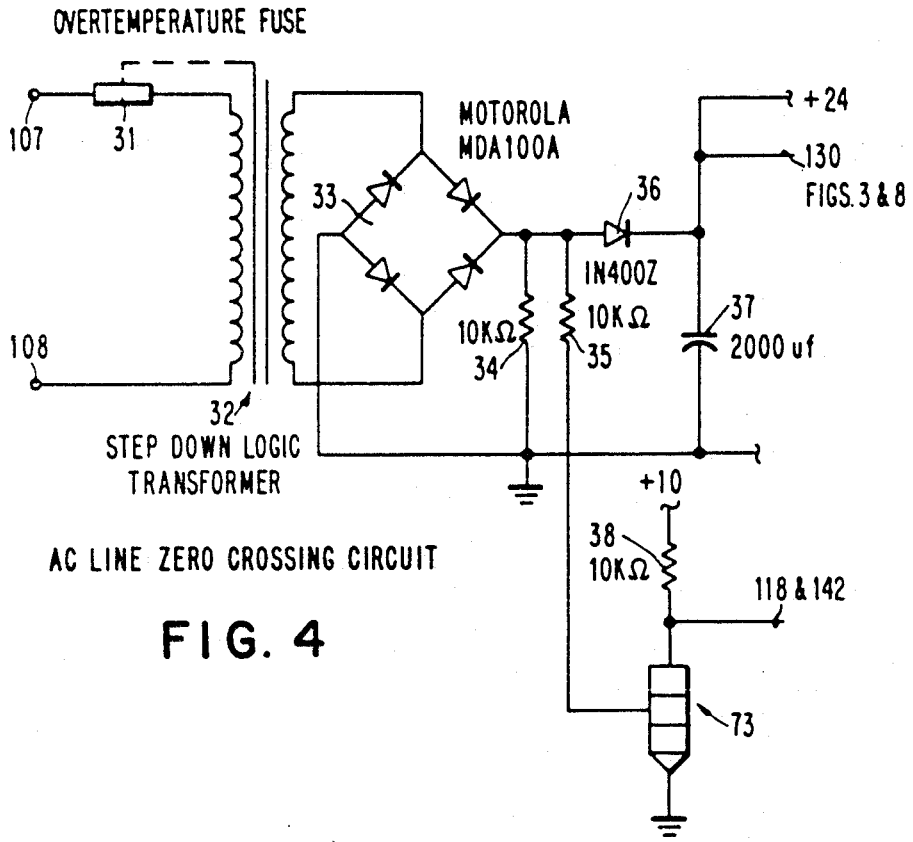
Figure 8:
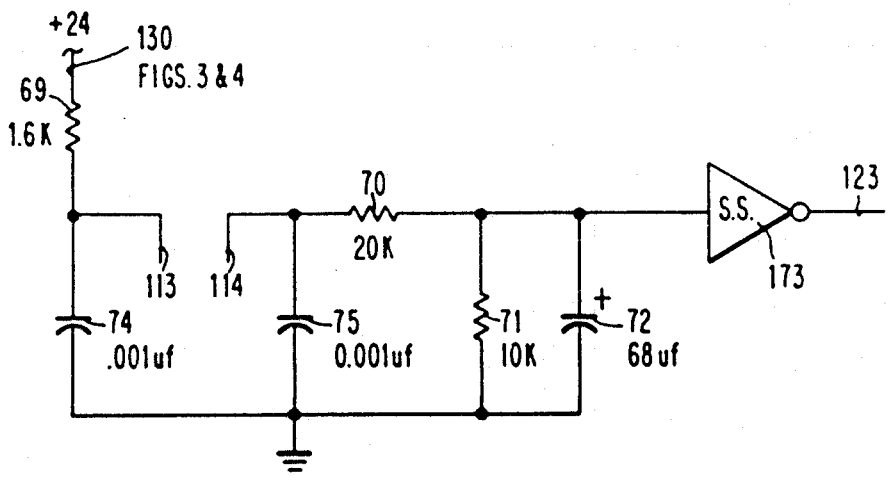
Figure 5:
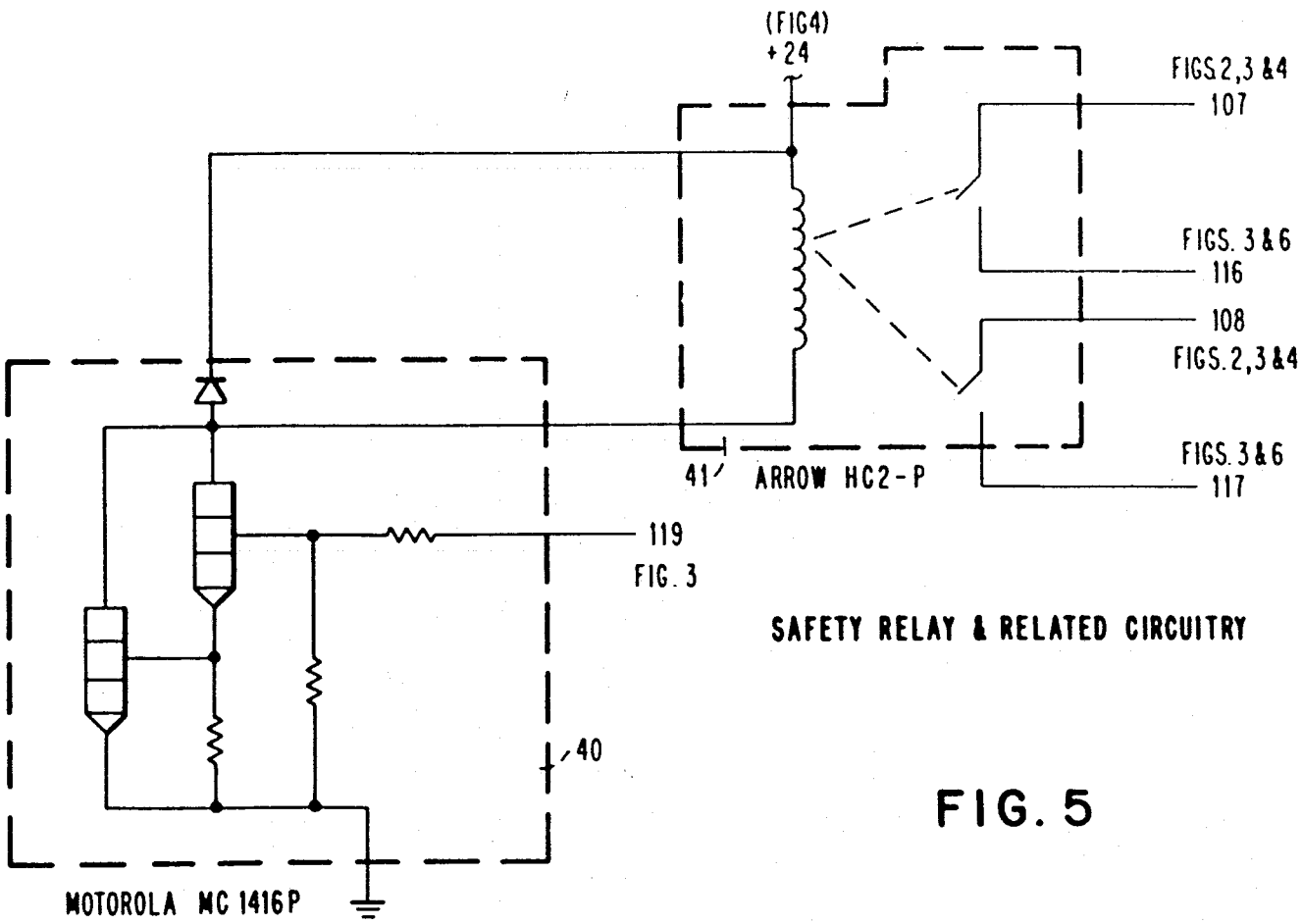
Figure 6:
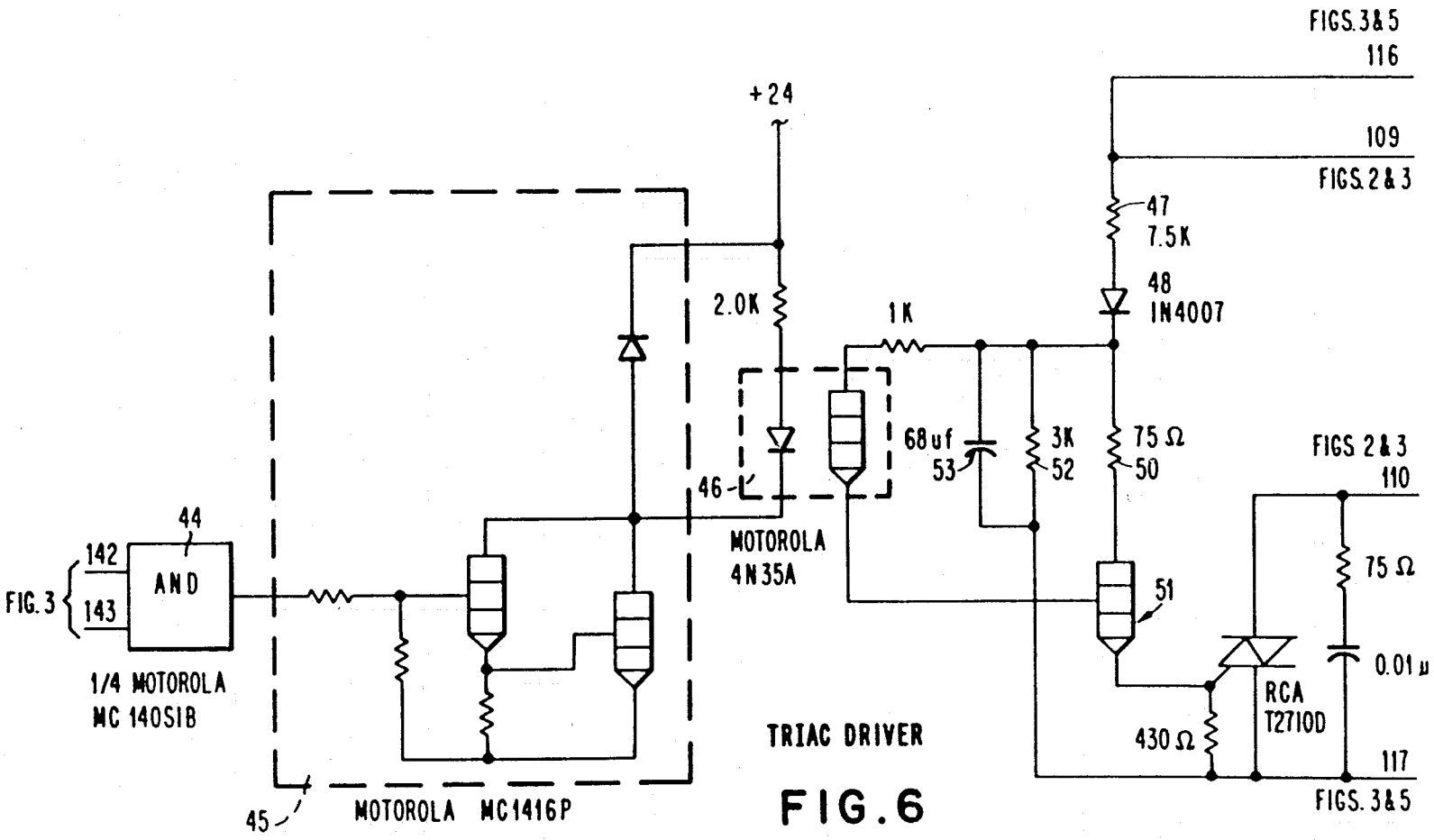
Figure 7:
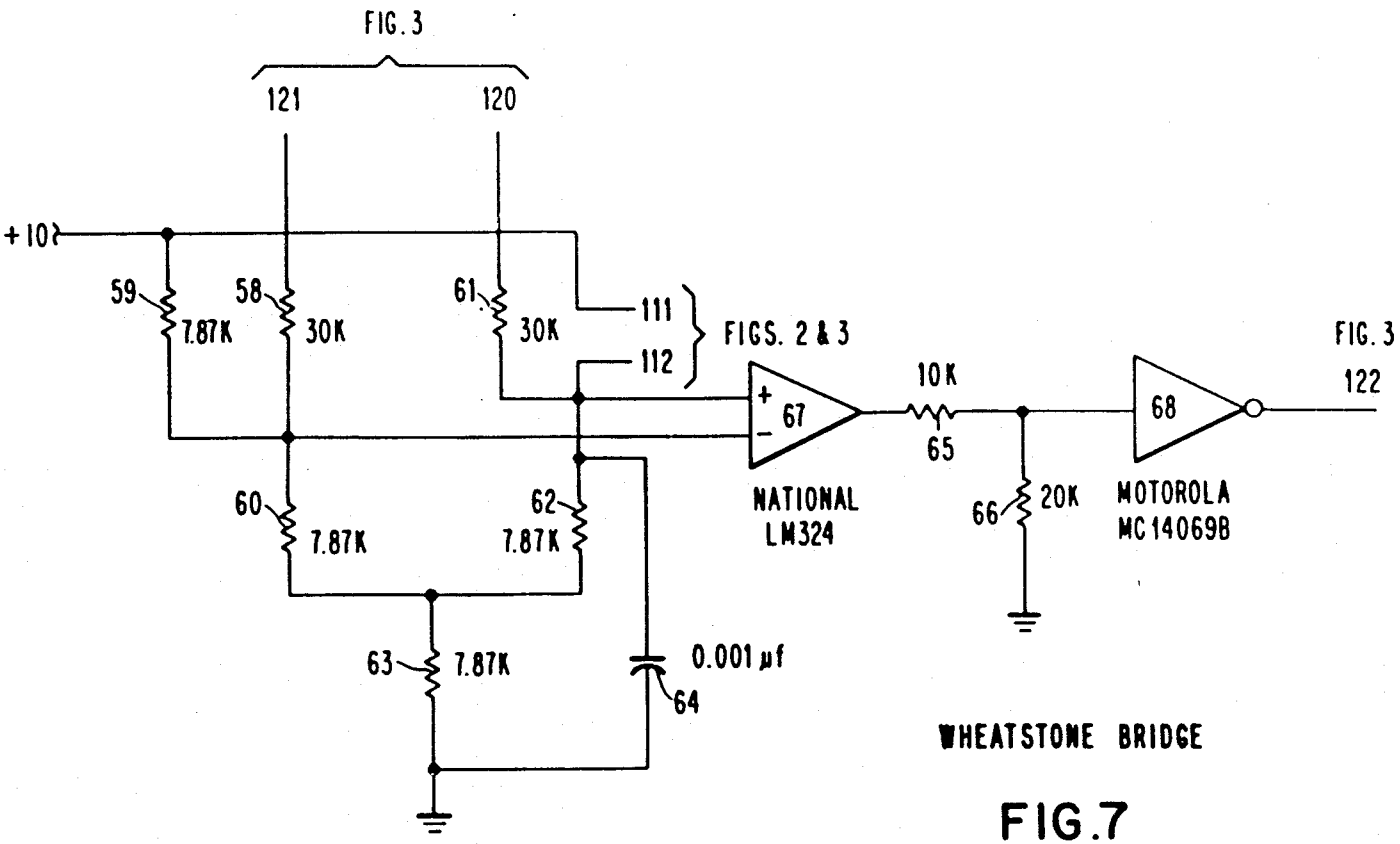
Figures 9, 9A:
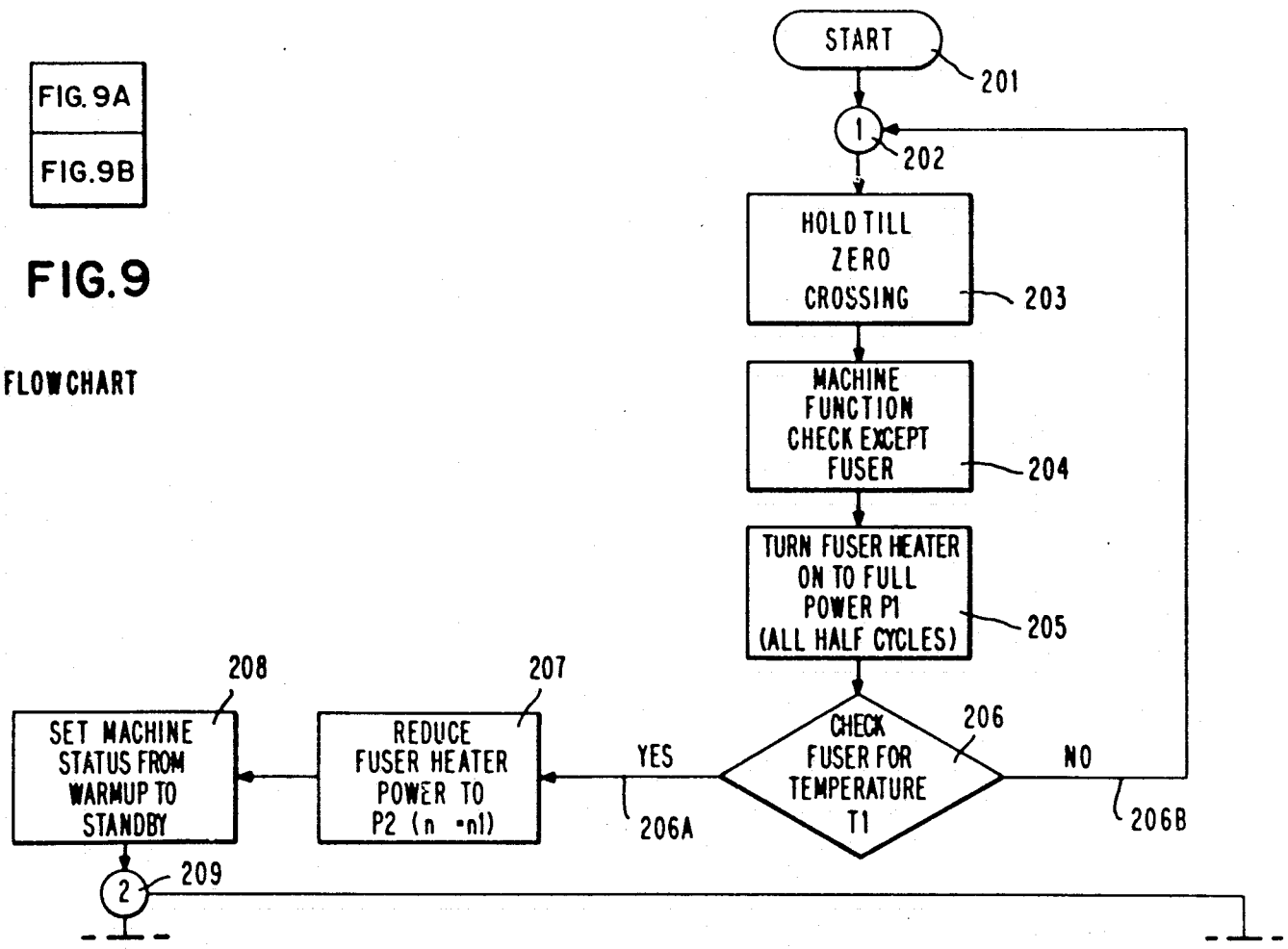
Figure 9B:
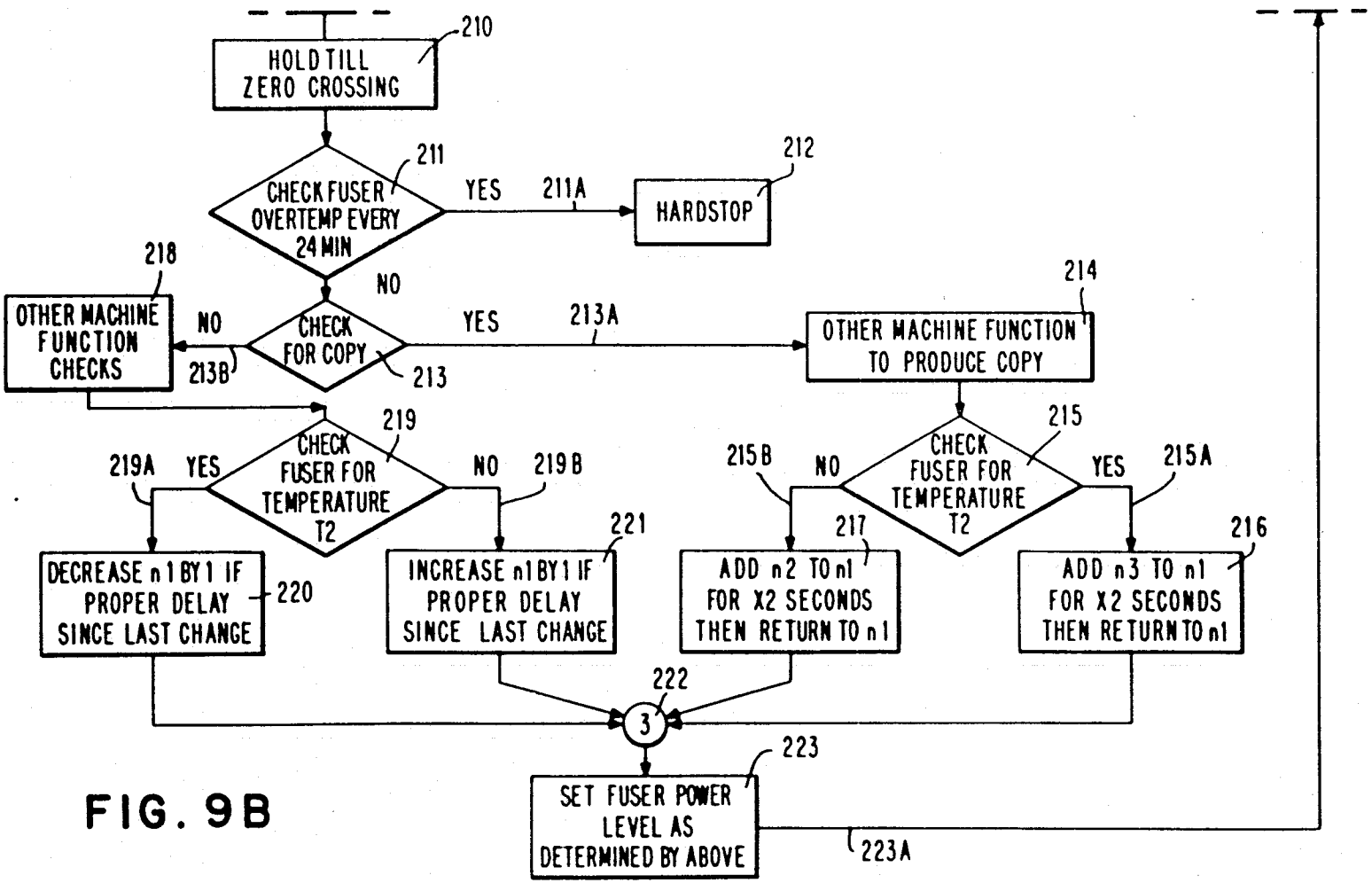

United States Defensive Publication [19] (H) [11] T100,804

Ernst [43] Jul. 7, 1981

[54] MICROPROCESSOR CONTROLLED POWER SUPPLY FOR XEROGRAPHIC FUSING APPARATUS

[76] Inventor: Larry M. Ernst, 5000 Butte #35, Boulder, Colo. 80301

[21] Appl. No.: 110,262

[22] Filed: Jan. 7, 1980

Related U.S. Application Data

[63] Continuation of Ser. No. 921,659, Jul. 3, 1978, abandoned.

[51] Int. Cl.[3] ..... G03G 15/00

[52] U.S. Cl. ..... 355/14 FU; 355/3 FU

[57] ABSTRACT

In a xerographic machine having control apparatus for regulating the temperature of a toner fusing device, said control apparatus comprising: a toner fusing device having electrical heater means for elevating the temperature of at least a portion of said fusing device; first means responsive to the temperature of said fusing device for providing an electrical manifestation indicative of the temperature of said fusing device; a controllable source of electrical energy for providing a controllable number of increments of electrical energy per unit of elapsed time to said heater means of said fusing device; and microprocessor means interconnecting said first means and said controllable source of electrical energy, whereby said microprocessor means in response to the electrical manifestation indicative of the temperature of said fusing device controls the number of increments of electrical energy provided to said heater means during each unit of elapsed time.

1 Claim, 9 Sheets Drawing,

49 Pages Specification

The file of this unexamined application may be inspected and copies thereof may be purchased (849 O.G. 1221, Apr. 9, 1968).

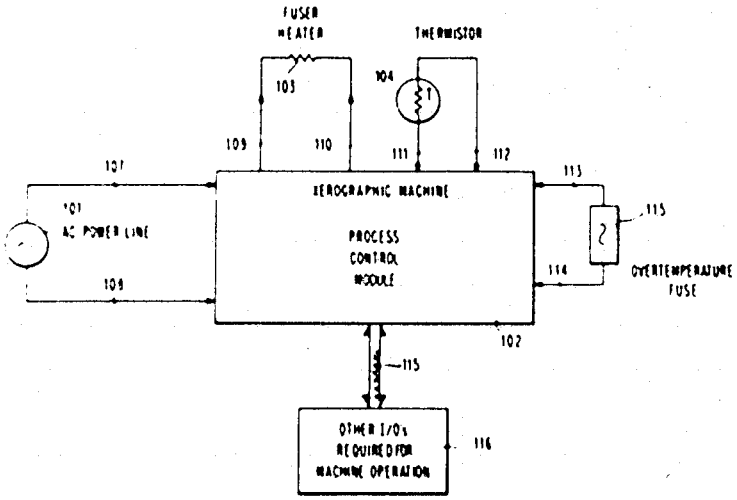

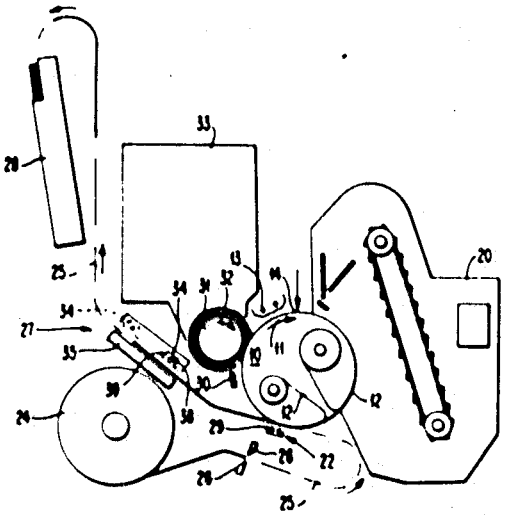

AC LINE ZERO CROSSING CIRCUIT

OVERTEMPERATURE FUSE DETECTION CIRCUIT

FIG. 9A | FIG. 9B

FLOWCHART